(12) United States Patent
Avganim

(10) Patent No.: US 7,097,404 B2
(45) Date of Patent: Aug. 29, 2006

(54) AUTO-TORQUE, TAMPER-PROOF SCREWS

(76) Inventor: Mair Avganim, 156 Moshav Gealiya 76885 M.P., Nachal Sorek (IL)

( * ) Notice: Subject to any disclaimer, the term of this patent is extended or adjusted under 35 U.S.C. 154(b) by 0 days.

(21) Appl. No.: 10/524,078

(22) PCT Filed: Jul. 24, 2003

(86) PCT No.: PCT/IL03/00611

§ 371 (c)(1),
(2), (4) Date: Feb. 3, 2005

(87) PCT Pub. No.: WO2004/012908

PCT Pub. Date: Feb. 12, 2004

(65) Prior Publication Data

US 2005/0244248 A1    Nov. 3, 2005

(30) Foreign Application Priority Data

Aug. 4, 2002 (IL) .................................. 151060

(51) Int. Cl.
| | |
|---|---|
| *F16B 35/04* | (2006.01) |
| *F16B 31/00* | (2006.01) |
| *F16B 33/04* | (2006.01) |
| *B25B 23/00* | (2006.01) |

(52) U.S. Cl. ................. 411/403; 411/2; 411/3; 411/4; 411/5; 411/910; 411/911; 81/460

(58) Field of Classification Search ............. 411/2–6, 411/403, 910, 911; 81/460; 428/916
See application file for complete search history.

(56) References Cited

U.S. PATENT DOCUMENTS

| | | | | |
|---|---|---|---|---|
| 2,659,952 A | * | 11/1953 | Schlueter .................... 411/349 |
| 4,109,691 A | * | 8/1978 | Wilson ........................ 81/119 |
| 4,223,585 A | * | 9/1980 | Barth et al. ................. 411/389 |
| 5,647,712 A | * | 7/1997 | Demirdogen et al. ....... 411/404 |
| 7,014,403 B1 | * | 3/2006 | Higganbotham et al. ...... 411/5 |

FOREIGN PATENT DOCUMENTS

| | | |
|---|---|---|
| BE | 567885 | 5/1958 |
| CH | 676872 | 3/1991 |
| DE | 4307633 | 5/1994 |
| DE | 199 04 053 A 1 | 2/1999 |
| EP | 0498693 A1 | 8/1992 |

* cited by examiner

*Primary Examiner*—Joseph J. Hail, III
*Assistant Examiner*—Bryan R. Muller
(74) *Attorney, Agent, or Firm*—Blakely Sokoloff Taylor & Zafman

(57) ABSTRACT

A screw having a screw-threaded shank and a circular head, the head being provided with three radially extending screwdriver tip receiving portions defined between three first, off central integrally formed projections designed to become shaved-off the screw head by a pre-set force applied during tightening of the screw, and three second, integrally formed projections designed to withstand a shear force greater than the pre-set force applied during slackening of the screw.

9 Claims, 5 Drawing Sheets

United States Patent US 7,097,404 B2

AUTO-TORQUE, TAMPER-PROOF SCREWS

The present patent application is a non-provisional application of International Application No. PCT/IL2003/000611, filed Jul. 24, 2003.

FIELD OF THE INVENTION

The invention relates to screws, and more specifically to restricted torque fastening screws.

BACKGROUND OF THE INVENTION

In the relevant industries, it is often required that fastening screws be tightened by a limited, controlled force, in order to avoid damage to the equipment or to fulfill other conditions, e.g. in case of a cover with a rubber seal which must not become over-squeezed.

Other, related examples, are cases where it is requested that once tightened, the screw cannot be slackened by ordinary tools such as a screwdriver, or at all.

Alternatively, a demand may be posed that it would be possible to unscrew the screw, but there will be clear and unmistakable indication that the screw has been tampered with by an unauthorized person.

The invention aims at proposing a solution satisfying any and all of these requisites.

It is a further object of the invention that the screw heads be produced by forging.

SUMMARY OF THE INVENTION

Thus provided according to the invention is a screw having a screw-threaded shank and a circular head, the head being provided with at least one radially extending screwdriver tip receiving portion defined between a first off-central, integrally formed projection designed to become shaved-off the screw head by a pre-set shear force applied during tightening of the screw, and a second, integrally formed projection designed to withstand a shear force greater than the said pre-set force applied during slackening of the screw.

There are preferably provided three pairs of the first and the second projections equi-angularly located on the head of the screw wherein the first projections are of a generally right-angled triangular cross-section seen in a plane normal to the radial direction of the screw head, and the second protrusions are of a generally isosceles triangle cross-section seen in a plane normal to the axis of the screw head.

A tool is provided for operating screws according to the invention, comprising a circular handle and three, equi-angularly arranged and radially extending ribs fitting into the said screwdriver tip receiving portions.

BRIEF DESCRIPTION OF THE DRAWINGS

These and additional constructional features and advantages of the invention will become more clearly understood in the light of the ensuing description of few preferred embodiments thereof, given by way of example only with reference to the accompanying drawings, wherein.

DETAILED DESCRIPTION OF THE PREFERRED EMBODIMENTS

Figure 1:
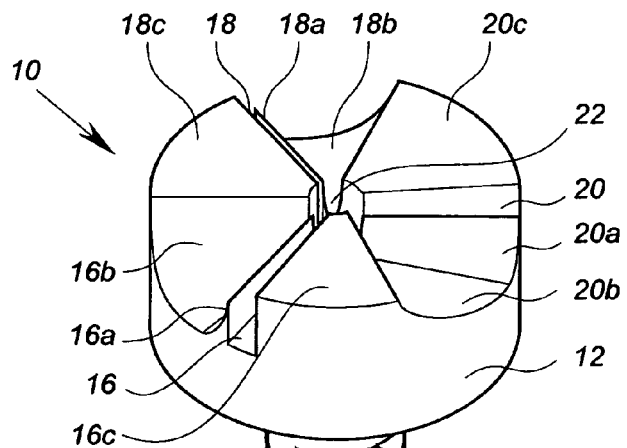
FIG. 1 is a three-dimensional view of a screw according to a first preferred embodiment of the invention.
Figure 2:
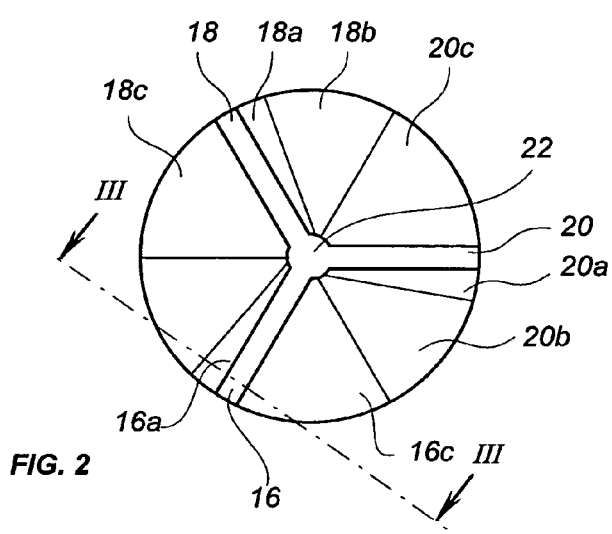
FIG. 2 is a top view of the screw of FIG. 1.
Figure 3:
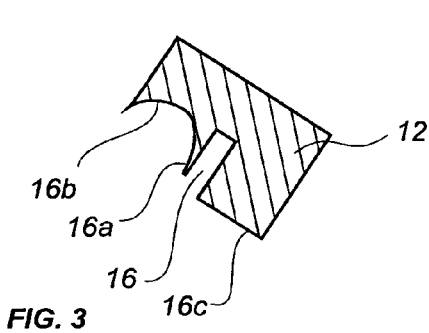
FIG. 3 is a section taken along line III—III of FIG. 2.
Figure 4:
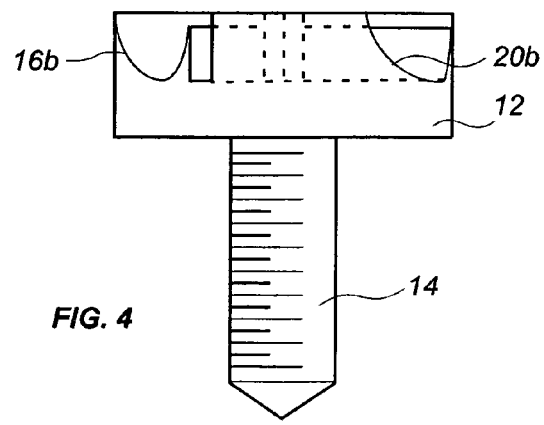
FIG. 4 is a side view of the screw of FIG. 1.

The embodiment of FIGS. 1–4 relates to a screw with limited tightening torque and indication if opened without authorization. The indication is given in such a manner that if the screw has been unscrewed—it cannot be closed again whatsoever.

Hence, the screw generally denoted 10 comprises a shoulder (machine-screw) head 12 and a shank 14. As will be made clear, the screw can be of any kind, either of the standard or of special design.

A pattern of cavities or depressions is applied to the top of the head 12, most conveniently, and as normally applied in the production of bolts and screws, by forging, in a one-time operation, as will be now described with respect to the present example. Variations and modifications of the pattern will be readily apprehended after understanding the design principles governing this embodiment.

At least one—but preferably three—radially extending slots 16, 18, 20 are present, equi-angularly arranged as shown. The slot 16 (see FIG. 3) is delimited at one side thereof by a first, off-centrally located projection 16a of a generally right-angled triangular cross-section (seen in a plane parallel to the axis of the head 12). The surface of the hypotenuse 16b slopes from the root of the projection 16a up to the original top level of the head 12 (projection 18c—see below).

At the other side of the slot 16 there is formed a solid projection 16c of a generally isosceles triangle cross-section as seen in a plane normal to the axis of the head 12.

Similarly, slot 18 has triangular projection 18a and curved surface 18b at one side, and projection 18c at the other side; and the same applies to the slot 20. Preferably, a circular depression (or boss) 22 is made at the center (the apexes of the triangles 16c, 18c, and 20c).

Figure 5:
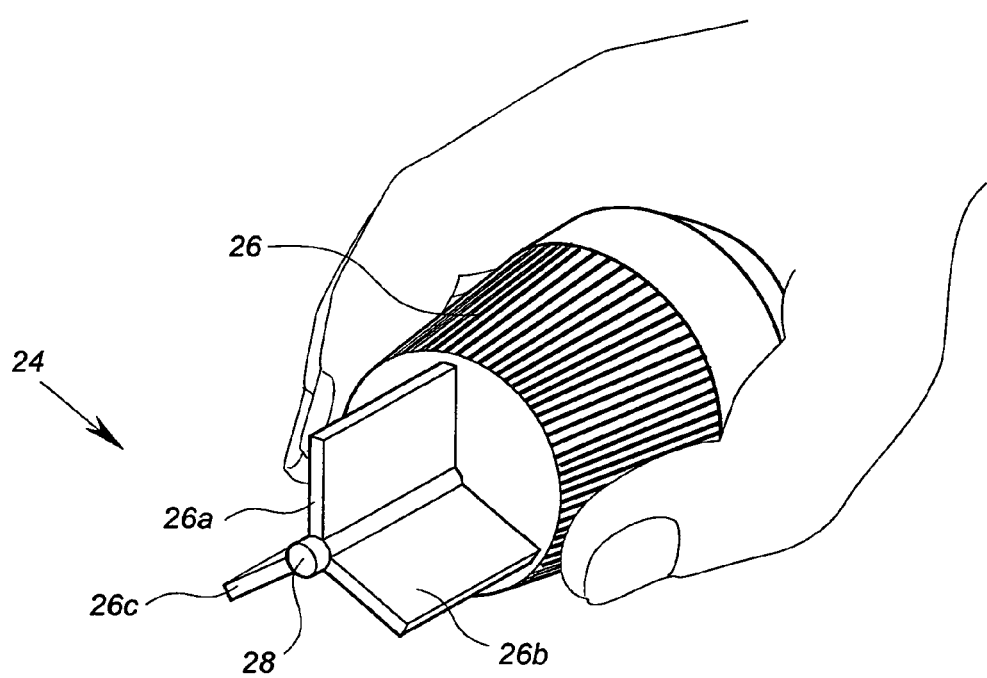
FIG. 5 illustrates a tool for tightening the screw of FIG. 1

An operating tool or driver for the screw 10 is shown in FIG. 5. The tool denoted 24 has a hand gripping handle (or electric screwdriver standard coupling tip) 26, three elongated radially extending ribs 26a, 26b, 26c and a central pin 28, designed to fit the slots 16, 18, 20, and the depression (or boss) 22, respectively.

In use, namely fastening a workpiece by the screw 10, the screw is turned by the tool 24 and tightened by an increased torque until the projections 16a, 18a, and 20a are simultaneously torn or shaved off by the shear force applied to the respective roots thereof.

The amount of the maximum applicable torque can be pre-determined by correctly calculating the collective shear strength that will cause the breaking of the projections, the relevant parameters being the cross-sectional area of the roots and the shear strength of the material the screw is made of.

Once broken, further rotation of the tool would simply "throw" the tool out of the respective slots to merely idle over the top of the screw head 12.

However, and in that respect uniquely different from prior art auto-torque screws, although opening of the screw 10 remains possible, by turning the head 12 in the opposite (counter-clockwise) direction by the tool 24, the re-fastening thereof is not possible.

Hence, let us take the following frequent example where a manufacturer of certain equipment makes it a condition to the validity of its warranty that no one except authorized personnel would be allowed to dismantle any part of it. Once a purchaser attempts to release the screws by himself, he will be compelled to replace them by "ordinary" screws when bringing the equipment to repair under the warranty, which will immediately indicate that the above condition has been violated and free the manufacturer of its obligation.

Figure 6:
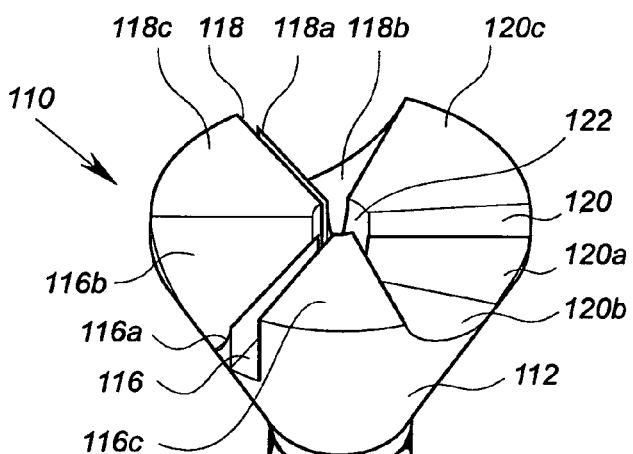
FIG. 6 is a three dimensional view of a screw according to a second preferred embodiment of the invention.
Figure 7:
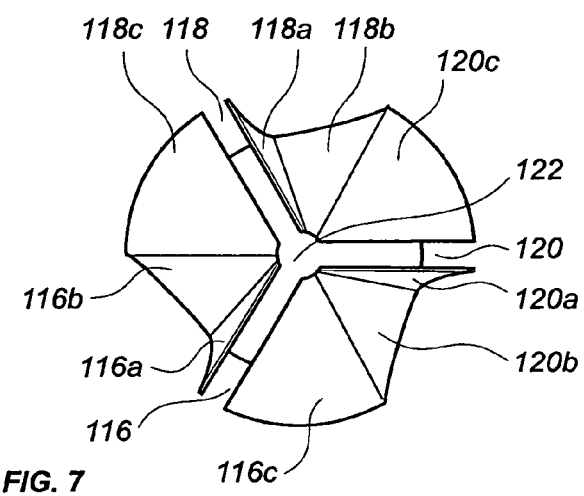
FIG. 7 is a top view of the screw of FIG. 6.
Figure 8:
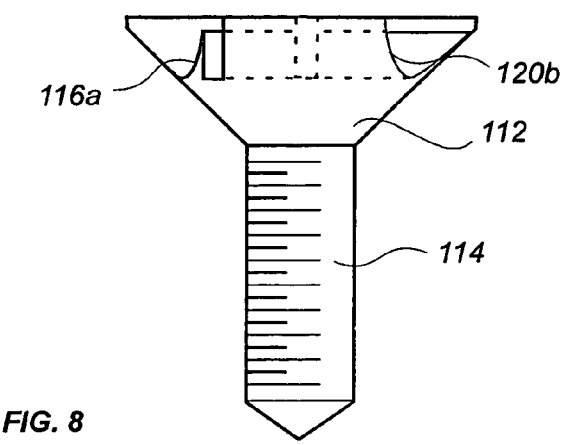
FIG. 8 is a side view of the screw of FIG. 6.
Figure 10:
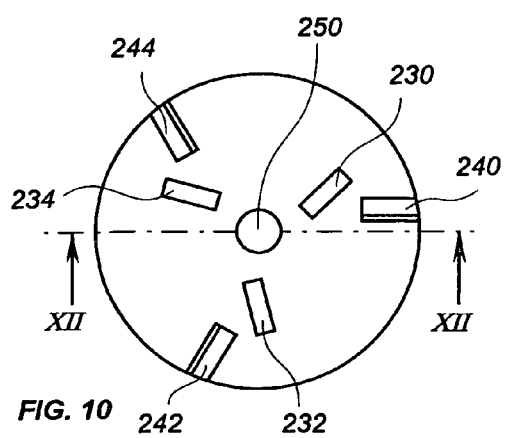
FIG. 10 is a top view of the screw of FIG. 9.
Figure 9:
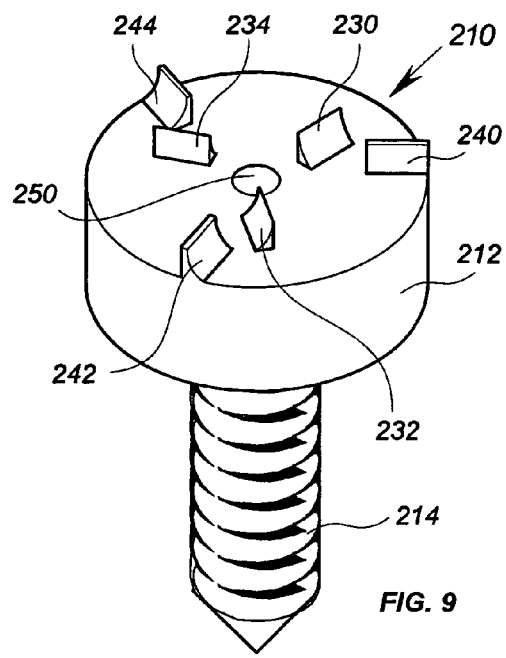
FIG. 9 is a three-dimensional view of a screw according to a third preferred embodiment of the invention.
Figure 11:
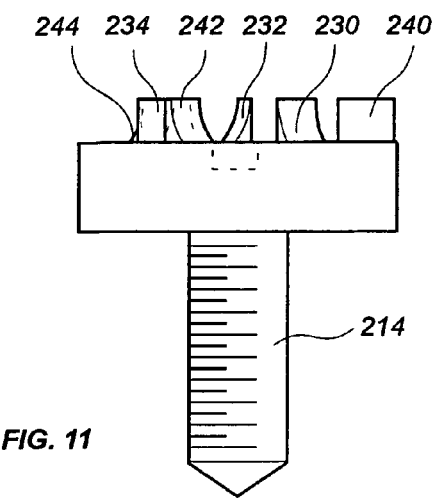
FIG. 11 is a side view of the screw of FIG. 9.
Figure 12:
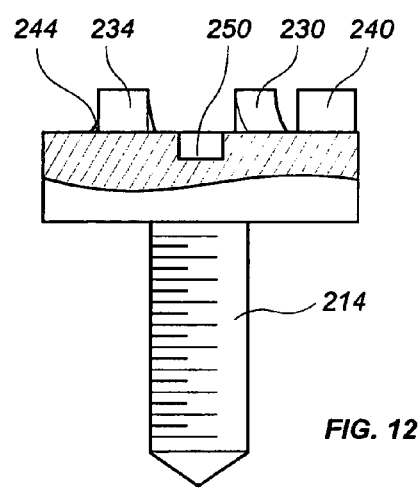
FIG. 12 is a partial cross-sectional view taken along line XII—XII of FIG. 10.

FIGS. 6–8 exemplify application of the invention to a flat head (wood) screw and is otherwise analogous to the preceding embodiment and therefore similar reference numerals are used.

Hence, provided at the screw 110 are three slots 116, 118, 120 and their related shearable projections 116a–120a, etc.

In the modified embodiment of FIGS. 9–13, no screwdriver slots in the normal sense of the term are present, but rather two sets of unidirectional projections are formed as will now be described. Machine screw 210 with shoulder head 212 is formed with a first set of projections—three in the described example—denoted 230, 232, and 234 which are functional for closing the screws; a second set of projections 240, 242, 244 for unscrewing; and central bore (or projection, at the option of the designer) 250.

Again emphasized is that this pattern is easily attained by press-forging so that, as in the preceding embodiments, the projections are integrally formed with the head 212.

The first set of projections 230–234 have a right-angled triangle cross-section. The hypotenuses of the triangles extend radially facing the same, clockwise direction.

The second set of projections 240–244 are spaced from the projections of the first set both in radial and in the angular directions, with hypotenuses facing the opposite, counter-clockwise direction.

Figure 13A:
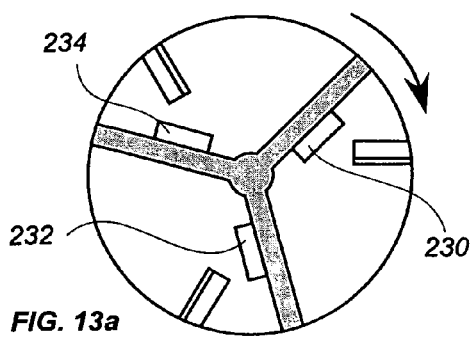
FIG. 13a schematically shows the tightening operation of the screw of FIG. 9 by a designated tool.

The total roots area of the first set is calculated to yield (become shaved off) by shear, under a pre-determined force applied by a driving tool (see FIG. 5) represented by the shadowed surface depicted in FIG. 13a.

Figure 13B:
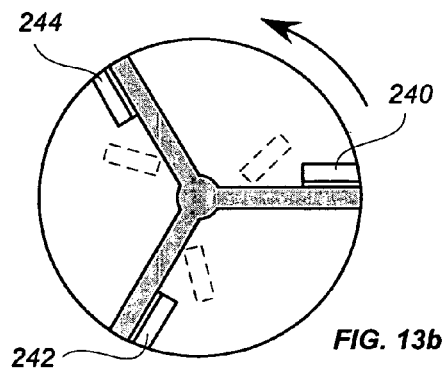
FIG. 13b shows the unscrewing operation of the screw using the same tool.
Figure 15:
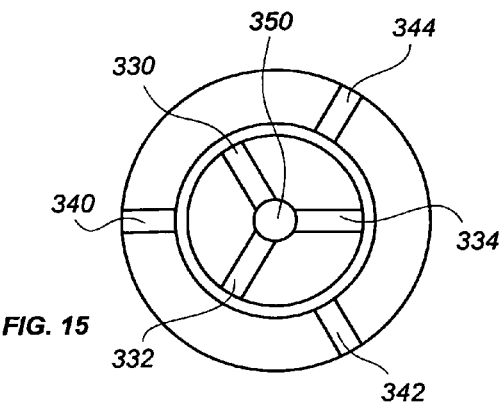
FIG. 15 is a top view of the screw of FIG. 14.
Figure 14:
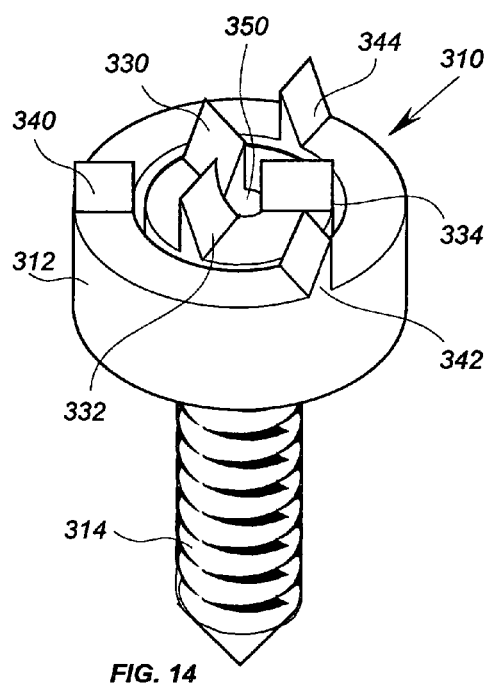
FIG. 14 is a three dimensional view of a screw according to a fourth preferred embodiment of the invention.
Figure 16:
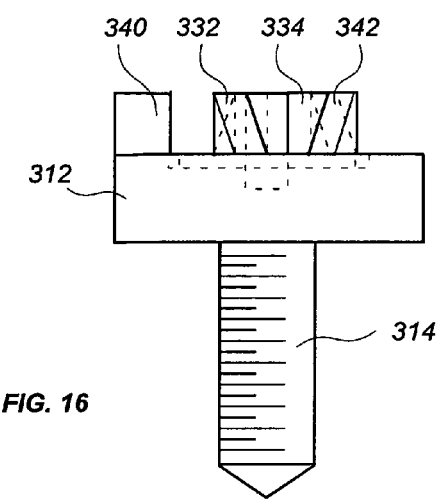
FIG. 16 is a side view of the screw of FIG. 14.
Figure 17A:
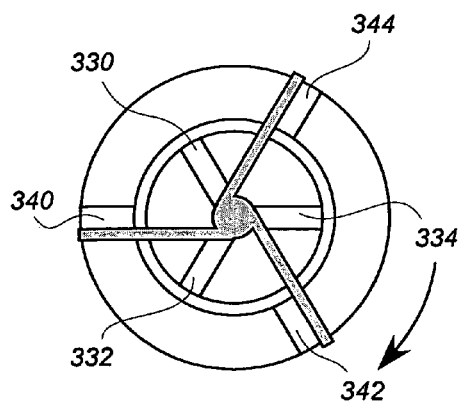
FIG. 17a shows the tightening operation of the screw at FIG. 14 by a designated tool.
Figure 17B:
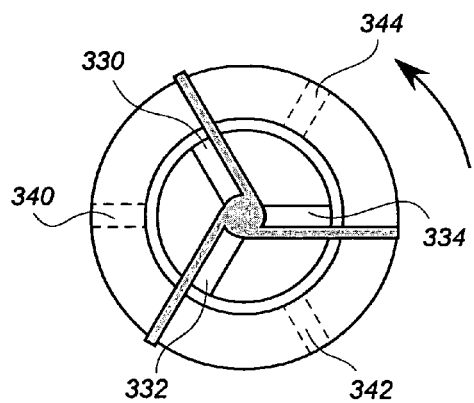
FIG. 17b shows the unscrewing of the same screw.

The total roots area of the second projections would preferably be made to withstand a greater force, for unscrewing (in the appropriate cases—if at all) by turning the screw-driving tool in the counter-clockwise direction as depicted in FIG. 13b.

Once torn away by the shear force applied during the tightening stage (FIG. 13a), the second set of projections neutralizes the operation of the tool in the closing direction due to the sloping sides of the projections 240–244.

The embodiment of FIGS. 14–17 is a modification of the preceding embodiment. As evident, the shear-controlled projections are those denoted 340, 342, and 344, namely located around the outer circumference of the head 310, whereas the unscrewing projection 330–334 are deployed along an inner circle.

Also noteworthy is the fact that in this example the driving tool (seen as shadowed areas in FIGS. 17a and 17b) is not identical for closing and for opening the screw (one being a mirror-image of the other).

The invention thus offers a novel and efficient solution fulfilling the objectives as specified in the preamble paragraphs above.

Those skilled in the art to which this invention pertains will readily appreciate that numerous changes, variations and modifications can be effectuated without departing from the true spirit and scope of the invention as defined in and by the appended claims.

What is claimed is:

1. A screw having a screw-threaded shank and a circular head, the head being provided with at least one radially extending screwdriver tip receiving portion defined between a first integrally formed projection of a generally right-angled triangle cross-section seen in a plane parallel to the axis of the screw head wherein the hypotenuse of the right angled triangle slopes from the bottom of the first projection to the top thereof such that it is designed to become shaved-off the screw head by a pre-set shear force applied during tightening of the screw, and a second integrally formed projection designed to withstand a shear force greater than the said pre-set force applied during slackening of the screw.

2. The screw of claim 1 comprising three pairs of the first and the second projections equi-angularly located on the head of the screw.

3. The screw of claim 2 wherein the sloping side of the first projections face the tightening, clockwise direction of the screw.

4. The screw of claim 3 wherein the second projections are of a generally isosceles triangle cross-section seen in a plane normal to the axis of the screw head.

5. The screw of claim 3 wherein the second projections are of a generally right-angled cross-section seen in a plane parallel to the axis of the screw head.

6. The screw of claim 5 wherein the hypotenuse of the right angled triangle slopes from the bottom of the second projections to the top thereof.

7. The screw of claim 6 wherein the sloping side of second projections face the slackening, counter-clockwise direction of the screw.

8. The screw of claim 1 further comprising a circular depression at the center of the head.

9. The screw of claim 1 further comprising a circular boss at the center of the head.

* * * * *